US006683820B1

(12) United States Patent
Struzinski

(10) Patent No.: US 6,683,820 B1
(45) Date of Patent: Jan. 27, 2004

(54) METHOD AND APPARATUS FOR TRACKING SONAR TARGETS

(75) Inventor: William A. Struzinski, New London, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/244,926

(22) Filed: Sep. 12, 2002

(51) Int. Cl.[7] .......................... G01S 15/04; G01S 15/66
(52) U.S. Cl. ........................................ 367/131; 367/124
(58) Field of Search ................................. 367/131, 135, 367/124, 907; 342/90, 96; 382/103

(56) References Cited

U.S. PATENT DOCUMENTS 4,989,186 A * 1/1991 Ricker .......................... 367/98
5,587,929 A * 12/1996 League et al. ............... 364/516
5,914,912 A * 6/1999 Yang ........................... 369/119
5,949,739 A * 9/1999 Reese .......................... 367/100
5,959,574 A * 9/1999 Poore, Jr. ..................... 342/96
5,991,238 A * 11/1999 Barr ............................. 367/62
6,041,019 A * 3/2000 Jackson et al. .............. 367/124
6,078,281 A * 6/2000 Milkovich et al. .......... 342/192
6,096,085 A * 8/2000 Sammelman .................. 703/2

OTHER PUBLICATIONS

Fortmann, T. E., et al., "Sonar Tracking of Multiple Targets Using Joint Probalistic Data Association", IEEE Journal of Ocean Engineering, vol. OE–8, No. 3, Jul. 1983.*

* cited by examiner

Primary Examiner—Ian J. Lobo
(74) Attorney, Agent, or Firm—James M. Kasischke; Michael F. Oglo; Jean-Paul A. Nasser

(57) ABSTRACT

A method and apparatus for analyzing newly acquired and faded or lost sonar contacts. Initial processing identifies a list of possible associations between a newly acquired contact and lost contacts. Subsequent processing of the possible associations reduces the number of possible associations that a sonar operator must consider in determining whether an acquired contact represents a new contact, a reacquired lost or faded contact.

20 Claims, 11 Drawing Sheets

FIG. 6

CONTACT MOTION MATCH MATRIX

| ELEMENTS | BR1>BR2 | BR1<BR2 | BR1=BR2 | SNRR1>0 | SNRR2>0 | SNRR2<0 | SNRR1<SNR2 | SNR1>SNR2 | BR1=K | BR2=K | BR1=0 | BR2=0 | RR1>0 | RR1<0 | RR2>0 | DER1>0 | DER1<0 | DER2>0 | DER2<0 | DE1<DE2 | DE1>DE2 | DE1=DE2 |
|---|---|---|---|---|---|---|---|---|---|---|---|---|---|---|---|---|---|---|---|---|---|---|
| B1=B2 | | | x | | | | | | x | x | x | x | | | | | | | | | | |
| B1>B2 | | | | | | | | | | | | | | | | | | | | | | |
| B1>B2 | | | | | | | | | | | | | | | | | | | | | | |
| BR1>BR2 | | | | | | x | | x | | | | | | | | | | | | | x | |
| BR1<BR2 | | | | x | | | x | | | | | | | | | | | | | x | | |
| SNRR1>0 | | | | | | | | | | | | | | | | | | | | | | |
| SNRR1<0 | | | | | | | | | | | | | | | | | | | | | | |
| SNRR2>0 | | | | | | | | | | | | | | | | | | | | | | |
| SNRR2<0 | | | | | | | | | | | | | | | | | | | | | | |
| SNR1<SNR2 | | | | | | | | | | | | | | | | | | | | | | |
| R1>R2 | | x | | | | x | | x | | | | | x | | | | | | | | x | x |
| R1<R2 | x | | | | | x | x | | | | | | | x | | | | | | x | x | x |
| R1=R2 | | | | | | | | | | | | | | | | | | | | | | x |
| RR1>0 | | | | | | | | x | | | | | | | | | | | | | | |
| RR2>0 | | | | | | | | | | | | | | | | | x | | | | | |
| RR2<0 | | | | | | | | | | | | | | | | | | | x | | x | |
| DER1>0 | | | | | | | | | | | | | | | | | | | | | | |
| DER1<0 | | | | | | | | | | | | | | | | | | | | | | |
| DER2>0 | | | | | | | | | | | | | | | | | | | | | | |
| DER2<0 | | | | | | | | | | | | | | | | | | | | | | |

METHOD AND APPARATUS FOR TRACKING SONAR TARGETS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to sonar systems and more specifically to a method and apparatus for determining whether recently acquired sonar contact information represents the acquisition of a new contact or the reacquisition of a previous contact that was lost.

(2) Description of the Prior Art

The use of sonar systems for tracking targets or contacts is well known, as are a wide variety of factors that effect the information derived from the sonar signals. Many of these factors cannot be controlled and include seawater temperature, salinity and other variables pertaining to seawater.

With early sonar systems, operators provided information about vessel range, bearing and identification using their experience and a priori knowledge to compensate for such factors. Over the years, however, a number of improvements have been made to automate certain analyses of sonar signals thereby to increase the accuracy and quality of an operator's interpretation.

For example, U.S. Pat. No. 5,566,134 (1996) to Dufault discloses an algorithm that detects, enhances, tracks and displays both stable and unstable passive sonar signals while organizing them into dynamically related groups. Processing includes power spectrum analysis on a segmented time-wave-form from a hydrophone, processing of the spectra for detection and enhancement of the signal by various methods and formatting and displaying the detected and enhanced signals. More specifically, Automatic Band Tracking algorithms (ABT) detect persistent signals having related features by means of correlation and enhance the signals by mathematical integration (or smoothing). Signals belonging to several unrelated sets may be processed by successive ABTs with each ABT simultaneously displaying its processed portion of the total signal-content while removing precisely that signal from the spectrum to which the succeeding ABTs are assigned.

U.S. Pat. No. 5,914,912 (1999) to Yang discloses a sonar array post processor that employs adaptive processing, called matched beam processing, in the beam domain which takes analog or digital conventional beam-forming outputs from a sonar array, multiplies them by a set of adaptive weighting coefficients and produces a new set of beams. A new output beam of highest intensity yields the ideal maximum signal gain and correct target bearing. Continuous target tracking provided by the sonar array post processor in the endfire direction of a horizontal line array minimizes towing ship maneuvers and for a bottom mounted surveillance system requires a smaller number of arrays.

In U.S. Pat. No. 5,949,739 (1999) to Reese an improved bearing estimation sonar system provides high resolution imaging of extended multi-highlight targets at long ranges. The complex outputs of a pair of offset-phase centered beams are first processed by segmented replica correlators to achieve pulse compression, followed by cross-correlation to provide high fidelity bearing estimates for target imaging. The technique exploits space-time coherence properties of the signal received from the target to extract high resolution target information. Data editing schemes enhance discernability of submarine-like targets which is essential for target classification.

U.S. Pat. No. 5,991,238 (1999) to Barr discloses a method for attenuating water column reverberations in a dual sensor seismic signal whereby a pressure signal and a velocity signal are transformed from a time domain to a frequency domain and for generating a transformed pressure signal and a transformed velocity signal, respectively. Values for weighting factors, $K_p$ and $K_v$, are selected and multiplied times the transformed pressure signal and the transformed velocity signal, respectively, generating a weighted pressure signal and a weighted velocity signal, respectively. The weighted pressure signal and the weighted velocity signal combine to generate a summed signal. Values for ocean bottom reflectivity R and Z, the frequency domain delay operator for two-way travel time in the water layer, are determined. A weighted inverse Backus filter is calculated and multiplied times the summed signal to generate a filtered signal that is transformed from the frequency domain to the time domain.

In U.S. Pat. No. 6,041,019 (2000) to Jackson et al. a method of data fusion determines a best-estimate solution to a moving contact using a plurality of trackers that provide bearing-to-contact data and range-to-contact data. An averaging function applied to the bearing-to-contact data determines weighted-average bearing data associated with each tracker. The same averaging function applied to the range-to-contact data determines weighted-average range data. A computed solution to the moving contact is generated using the weighted-average range data and the weighted average bearing data from the one tracker having the lowest standard deviation. A root mean square (RMS) error in terms of bearing is then determined for the computed solution and each of a plurality of independently generated solutions using bearing-to-contact data from the one tracker having the lowest standard deviation. One of the computed solution or independently generated solutions that produces the lowest RMS error constitutes the best-estimate solution.

U.S. Pat. No. 6,078,281 (2000) to Milkovich et al. discloses Fast Fourier Transformation (FFT) processing for measuring FFT output phase standard deviation over a number of consecutive FFT runs. The system corrects output phase in an organized fashion for all potential signal filter offset positions while measuring changes in phase standard deviation and selects the filter offset where the minimum standard deviation occurs. Pseudo coherent integration enhances and locates the mean phase shift within the number of FFTs integrated and corrects all FFT runs by this mean shift value. The integration multiplies the magnitude of each FFT filter output by the cosine and sums all FFT's in the integration period for the respective filter. Detections are then declared based on outputs from a combination of a single filter detector, a sum coherent and traditional detector, a filtered coherent detector and a filtered traditional detector, thereby utilizing various blended techniques across the filter bandwidth.

In U.S. Pat. 6,096,085 a sonar simulator includes a parameter definition code for defining a plurality of parameters of a sonar, target and sonar environment and a signal-to-noise ratio (SNR) computation code for computing a SNR of the sonar as a function of range to target based upon the parameters defined by the parameter definition code including ambient noise, the volume scattering strength of the sonar environment, a sound velocity profile of the sonar, beam patterns of both projector and receiver of the sonar, the sonar type and range resolution, the number of eigenrays striking the surface and bottom of the sonar environment and the target, ray trajectories to the target and surface and bottom scattering strength as a function of angle. A target strength model computes scattering for a selected complex target contained in a stored set of complex target selections thereby to generate a target strength model for the selected complex target.

The foregoing references disclose methods and apparatus for improving sonar signal analysis by the enhancement of a particular function. Primarily each reference suggests improving the data obtained from existing signals. However, various environmental factors, ship maneuvers and other phenomena can cause a signal from a particular target under analysis to be lost. In such an operating condition there is a question as to whether the acquisition of a contact represents the acquisition of a new contact or the reacquisition of a contact that had been lost some time earlier, commonly called a "faded contact". Notwithstanding the foregoing improvements, the process for classifying such acquired contacts as a new contact or a reacquired faded contact continues to be an essentially manual operation. That is, the classification remains primarily a function of operator experience. What is needed is a method and apparatus for facilitating and automating this classification process to enhance the quality of information derived from sonar signals.

SUMMARY OF THE INVENTION

Therefore it is an objective of this invention to provide a method and apparatus for providing enhanced solutions to the classification of recently acquired contacts in sonar signals.

Yet another objective of this invention is to provide a method and apparatus for automating the classification of recently acquired contacts in a sonar system.

Yet still another objective of this invention is to provide a method and apparatus for enhancing the classification of a recently acquired contact in a sonar system that minimizes the requirement for manual intervention and analysis.

In accordance with an aspect of this invention, the classification of a newly acquired contact from a sonar system as either a new contact or a reacquired faded contract includes the establishment of a record of faded contacts. An identification of associations between the recently acquired contact and each recorded faded contact is made. An analysis of the identified associations enables the classification of the newly acquired contact as being a new contact, a reacquired faded contact or a contact of indeterminate origin.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6 depicts a matrix that is useful in the contact motion match process of FIG. 5;

DESCRIPTION OF THE PREFERRED EMBODIMENT

Figure 1:
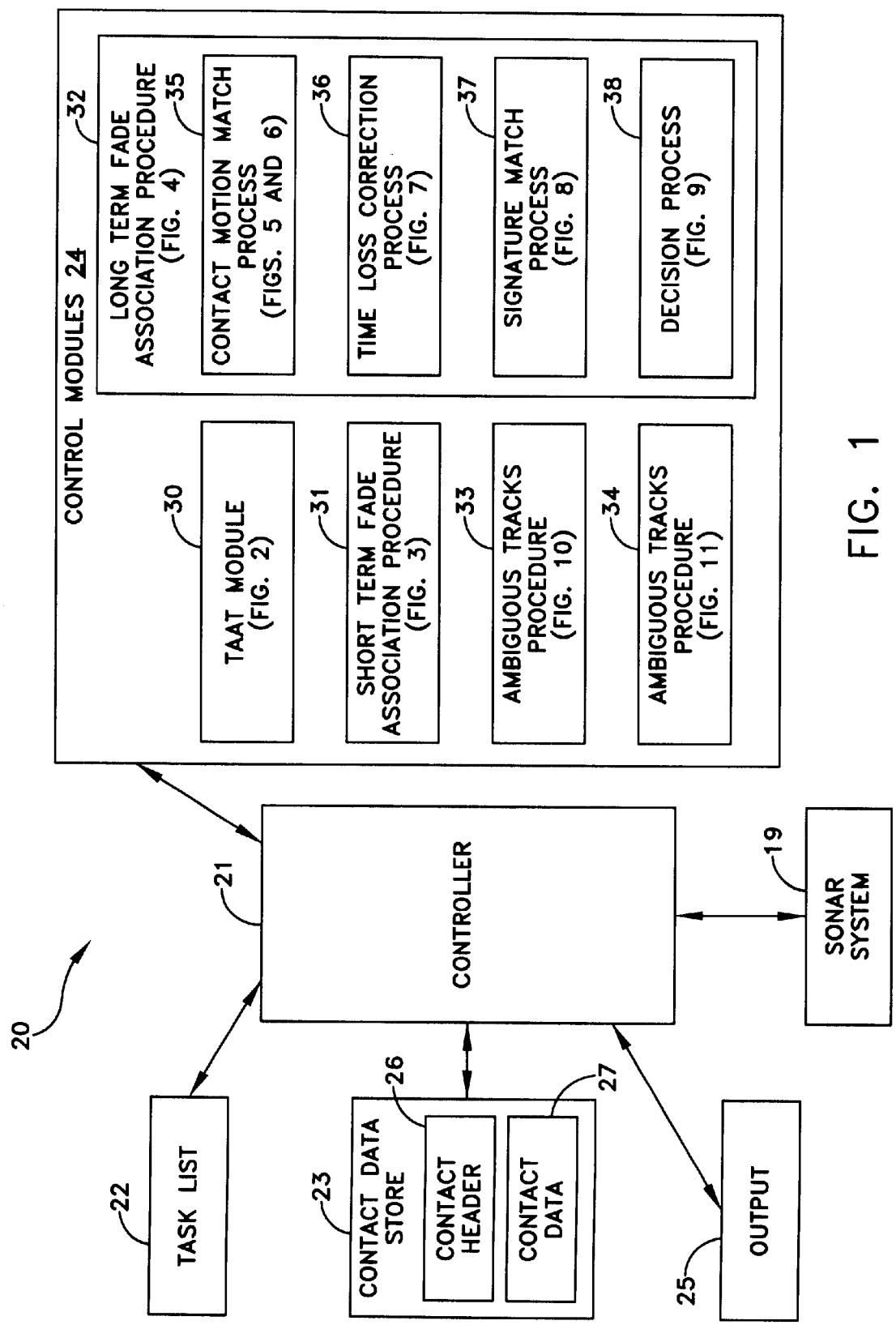
FIG. 1 is a schematic in block form of a system constructed in accordance with this invention.

FIG. 1 depicts apparatus 20 that implements a method by which a newly acquired contact from a sonar system 19 is classified as a new contact or a reacquired faded contact. A controller 21 coordinates the interactions between a task list 22, a contact data store 23, control modules 24 and an output 25. The contact data store 23 contains historical information about each contact processed over an extended period of time. The contact data store 23 contains header information in a contact header portion 26 and actual contact data in a contact data portion 27. The contact data includes time stamped entries for range and bearing to each contact identified by a contact header. The contact header 26 also classifies contacts as active or lost, or indeterminate contacts. For purposes of this invention the contact data store 23 constitutes a storage that maintains a record of faded contacts as well as the information concerning a newly acquired contact.

Control modules 24 analyze newly acquired contacts through a series of modules including a Track Association Across Time (TAAT) module 30 that controls the operation of several procedures including a short term fade association procedure 31, a long term fade association procedure 32, an ambiguous tracks procedure 33 and a "NO DECISION" tracks procedure 34. The long term fade procedure 32, includes several processes including a contact motion match process 35, a time loss correction process 36, a signature match process 37 and a decision process 38. In accordance with conventional techniques, the task list 22 identifies a number of different contacts to be analyzed for different purposes. The controller 21 implements the various procedures and processes in the TAAT module 30 whenever it interrogates the task list to characterizes a newly acquired contact as a new or reacquired faded contact.

Figure 2:
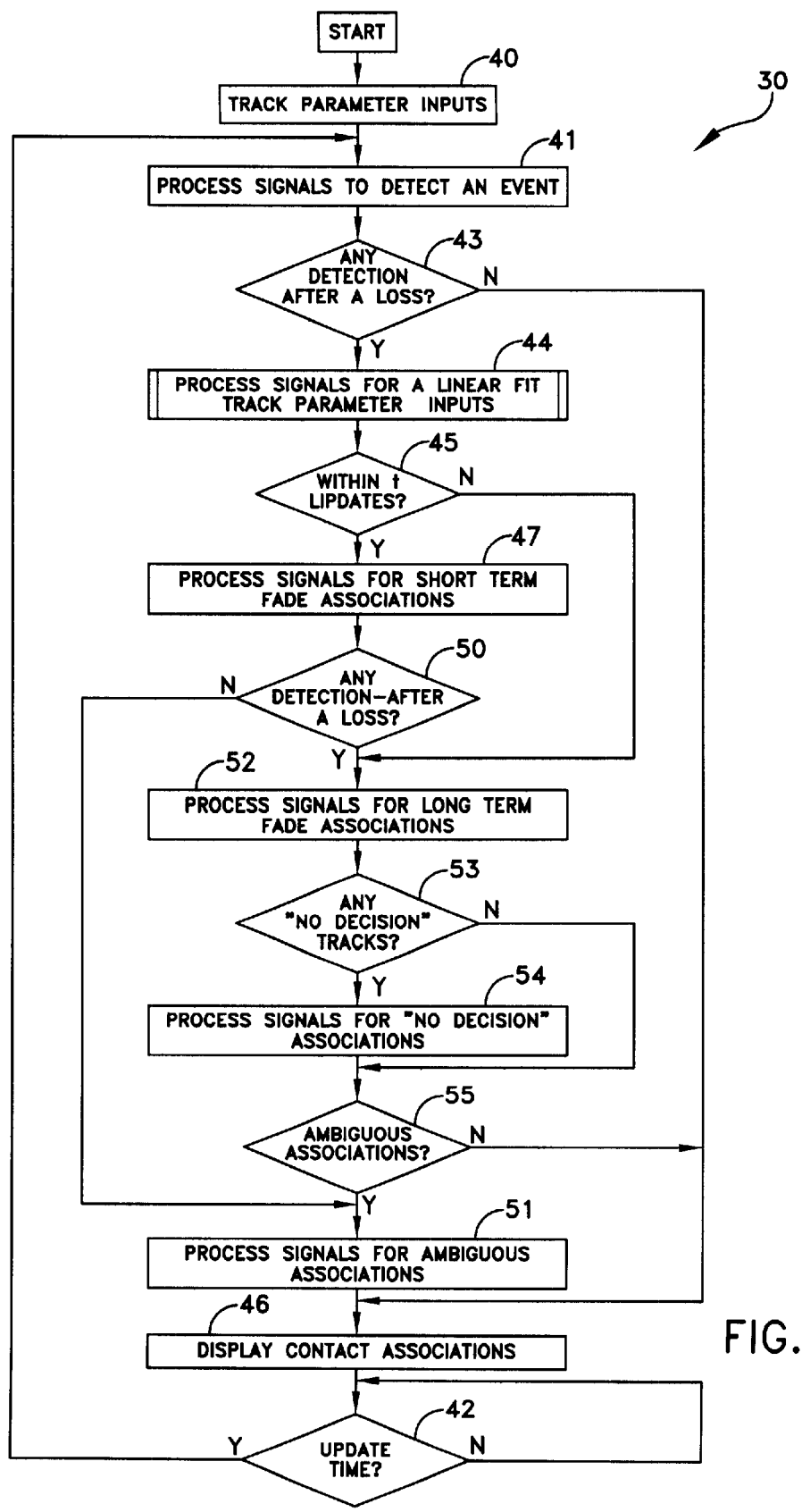
FIG. 2 is a flow chart that depicts the general operation of the system shown in FIG. 1.

When the controller 21 determines that sonar signals represent a newly acquired contact, the controller 21 begins processing the TAAT module 30 as shown more specifically in FIG. 2. The TAAT module 30 tracks parameters inputs at 40 and processes signals to detect an event in step 41. Step 41 and the remainder of the steps and procedures shown in FIG. 2 operate on an update time defined by step 42. Thus step 41 periodically processes signals to detect an event. Step 43 determines whether, when an event has been detected in the form of a newly acquired contact, any of the contact information in the contact data store 23 represents a faded contact. If a faded contact exists, step 44 processes the signals for a linear fit of the track parameter inputs in the newly acquired contact to those in a faded contact.

More specifically, the event detection process in step 41 scans the track table contained in the contact data store every time update. If the contact data store contains a faded contact, the track ID number and the time for the loss of detection are stored in a file. The event detection function in step 43 also transfers information about the newly acquired contact into the contact data store 23 and provides a new bearing track to the potential contact once that contact has existed for a predetermined period of time. The track for the newly acquired contact is then input to a linear fit process in step 44 along with all previously faded or lost contacts. Previously unassociated new detections and previously unassociated loss of detections are also input to the linear fit function. The linear fit function then determines whether any linear fit occurs with respect to any of the events for the current time update. If none exist, step 45 transfers control step 52 to process the signals for long term fade associations.

If, however, a linear fit exists between the newly acquired contact and a faded contact, the newly acquired signal is characterized as having a possible association with that faded contact. If the time between the loss of the faded contact and the acquisition of the newly acquired signal is short (e.g., up to T update intervals) control transfers from step 45 to step 47 that processes signals for a short term fade association. Generally, step 47 performs temporal linking of a bearing track lost with a bearing track detected within T time updates after the loss of detection. Step 50 then determines whether there continues to be a detection after a loss. If that condition does not exist, step 50 transfers control to step 51 to process signals for any ambiguous tracks. Otherwise step 50 transfers to step 52 that processes signals for long term fade association.

The long term fade association implements numerous rules that simulate a sonar operator's technique in manipulating the information to determine the likelihood of a probable reacquisition of a faded contact. When this is complete, the TAAT module 30 shown in FIG. 2 will have a list of possible identified associations between the newly acquired contact and one or more faded contacts. In essence these represent a filtered subset of the long-term and short-term fade association for further processing.

Step 53 begins an analysis of the possible associations in the subset to characterize the acquired contact as a new contact, a reacquired faded contact or a contact of indeterminate characterization. Specifically, steps 53 and 54 identify tracks of contacts for which new frequency detections are associated with the new bearing track. If no new frequency detections are identified, retesting continues until a decision is made.

After the process of step 54, step 55 determines whether there are any ambiguous associations. An ambiguous association exists when a newly acquired contact has an association with two or more faded contacts concurrently. Step 51 attempts to resolve any ambiguity. Step 46 then displays the various contact associations that presently exist between the newly acquired contact and a faded contact.

Figure 3:
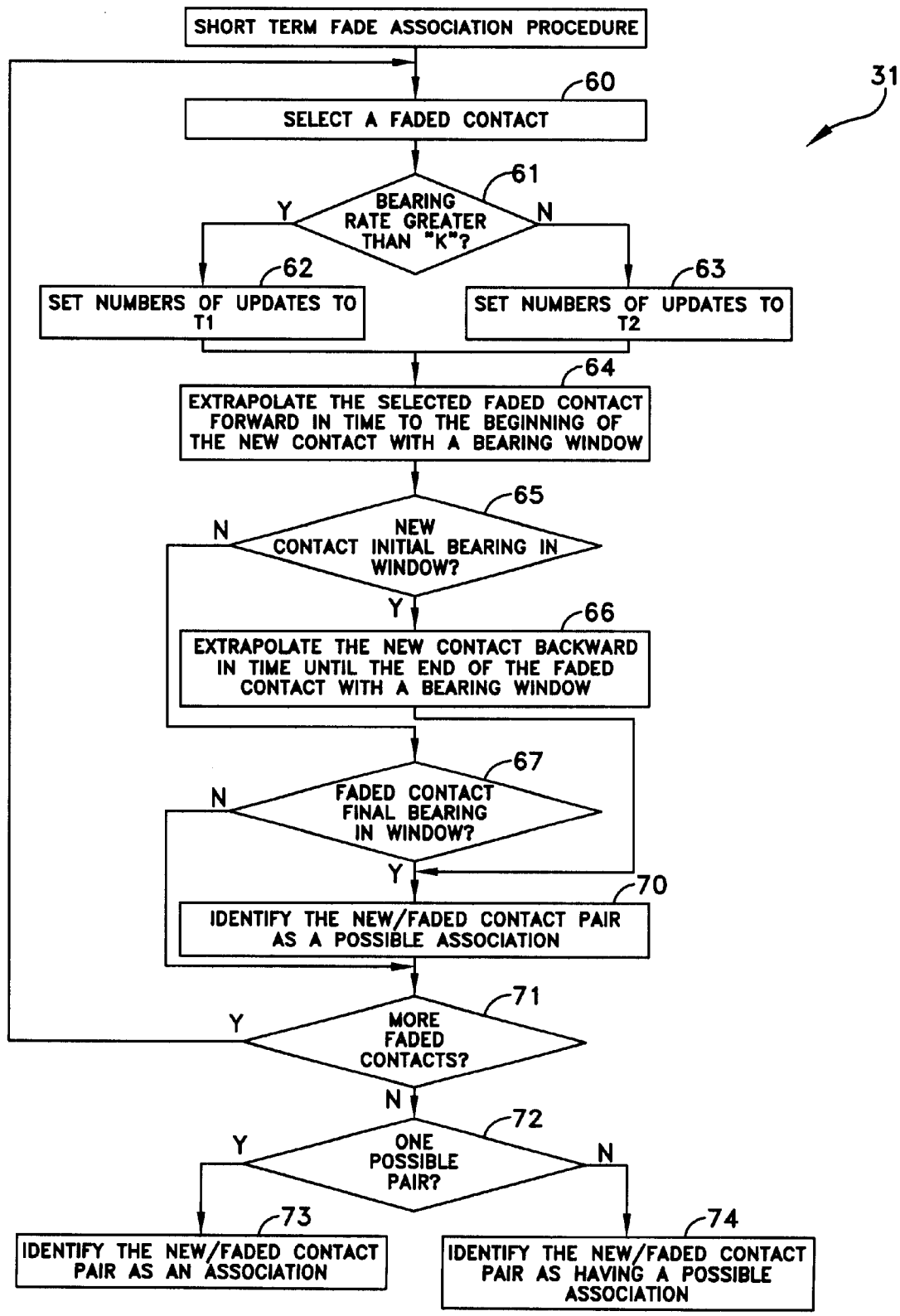
FIG. 3 is a flow chart of a short term fade association procedure used in the operation of FIG. 2.

As previously indicated, step 47 processes the signals to identify possible short term fade associations using the module 31 in FIG. 1. FIG. 3 depicts this module in greater detail. For a given newly acquired contact, step 60 selects one of the faded contacts in the contact data store 23 in the list of possible associations. To obtain the temporal linking, step 61 selects one of two time intervals. If the computed bearing rate of either contact is greater than a threshold, a value of T1 is selected in step 62. Otherwise step 63 selects a value of T2. In one specific example, the threshold "K"=1.2 degrees per minute, T1=15 and T2=25 to represent 15 and 25 updates. If a 12 second update rate is assumed, then T1 defines an interval of 180 seconds; T2, an interval of 300 seconds.

Once the selected interval has expired, the signals from the selected faded contact are extrapolated forward in time to a time corresponding to the acquisition of the new acquired contact. This extrapolation assumes a bearing window. Step 65 then determines whether the initial bearing to the new contact lies within the window established by the extrapolation of the faded contact. If it does not, step 65 transfers to step 66 that performs a corresponding extrapolation of the new contact backward in time until the time at which the faded contact was lost. This extrapolation also establishes a bearing window and step 67 determines whether the faded contact final bearing lies within that window. If either situation exists, the selected faded contact and newly acquired contact are designated as a possible association in step 70.

Step 71 determines whether there are any additional faded contacts in the possible association list and transfers control back to step 60. If either of steps 65 or 67 therefore is satisfied, the newly acquired and selected faded contact is considered to have a possible association. If neither step 65 nor step 67 is met, it is assumed that no such association can exist and step 67 transfers control back to step 60 to select another faded contact through step 71. If at the completion of the analysis of all the faded contacts only one possible pair exists, step 72 transfers control to step 73 that identifies the acquired contact and selected faded contact as an association. Otherwise step 74 identifies the pair as a possible association.

Figure 4:
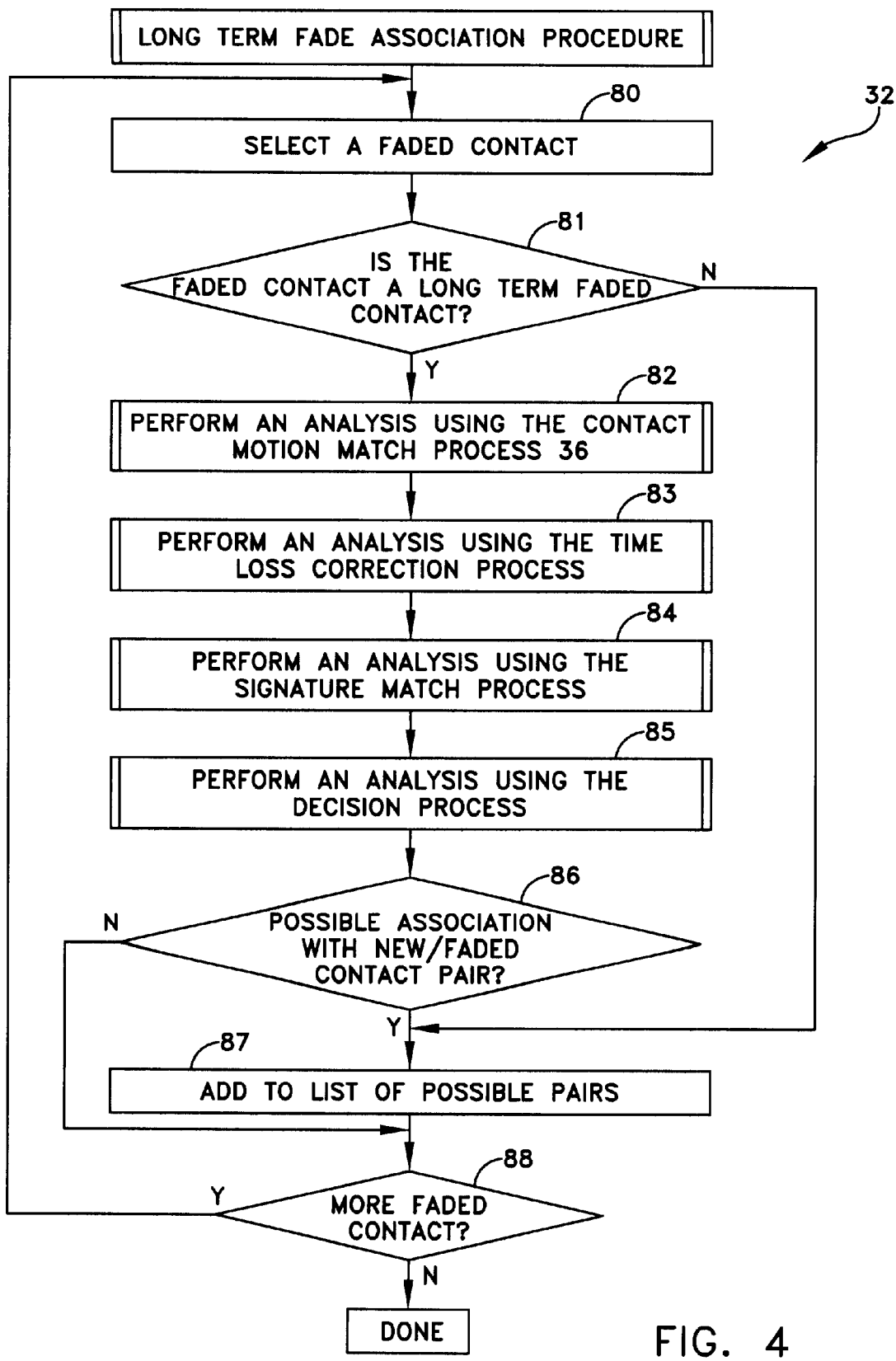
FIG. 4 is a flow chart of a long term fade association procedure used in the operation of FIG. 2.

A newly acquired contact and faded contacts separated by an interval exceeding the update value of step 45 in FIG. 2 are analyzed for a possible characterization as long term fade associations. FIG. 4 depicts in general terms, an analysis for long term fade associations. During this process a faded contact is selected in step 80 and categorized as a faded or recent contact in step 81. Each faded contact is analyzed by using a procedure 82 to perform the contact motion match process 35, procedure 83 to perform an analysis with the time loss correction process 36 in FIG. 1 and procedure 84 to perform an analysis in accordance with the signature match process 37 in FIG. 1. Step 85 then determines whether the selected faded contact represents a possible association with the newly acquired contact. If such a possible association exists, step 86 adds the possible association to the list of possible pairs. Otherwise control transfers to step 87 that tests for additional faded contacts in the contact data store for being analyzed with the newly acquired contact pair. When the process in FIG. 4 completes, the task list 22 contains a list of short term and long term fade associations.

Figure 5:
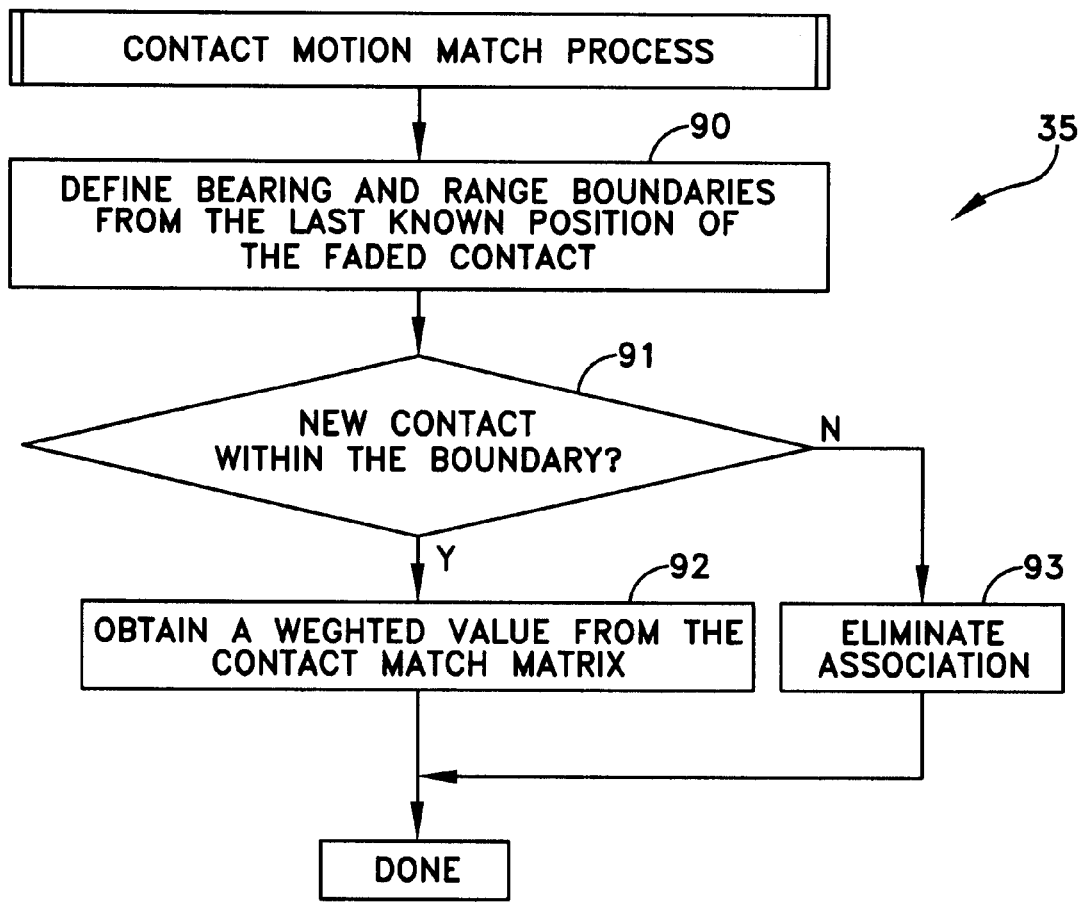
FIG. 5 is a flow chart of a contact motion match process useful in the long term fade association procedure of FIG. 4.

FIGS. 5 and 6 depict the contact motion match process 35 which essentially weights all the possible associations in response to a plurality of signal characteristics for the acquired and selected faded contacts. Initially the contact motion process defines bearing and range boundaries from the last known position of the selected faded contact and compares the position of the acquired contact with that boundary. More specifically, the contact motion match process 35 estimates the target's bearing and range known at the time that the faded contact disappeared. If the newly acquired target lies outside a boundary centered on the last known position with a radius equal to the possible distance that the faded contact could have traveled since the last recorded distance, then the newly acquired target should not be associated with the faded contact.

Step 90 in FIG. 5 defines the bearing and range boundaries from that last known position of the faded contact. Step 91 then determines whether the acquired contact has a bearing and range failing outside the boundary of possible ranges and bearings. If either the bearing or range falls outside the boundary, the possible association is eliminated. Otherwise step 91 transfers control to step 92 that weights the value of the possible association in accordance with the matrix of FIG. 6. In FIG. 6 numeral "1" refers to the faded contact and numeral "2" refers to the newly acquired contact. "B" and "BR" identify the bearing and bearing rates respectively. "SNR" and "SNRR" relate to the signal-to-noise ratio from the incoming signal and the signal-to-noise ratio rate. "R" and "RR" refer to the range and the range rate. "DER" refers to the declination or elevation rate. Each "X" indicates a match. Step 92 assigns an overall weight based on the resulting matches from the matrix FIG. 6. There are 46 possible matches that can be obtained from the matrix. If the total number of possible matches is scaled to 100, then each match attained is assigned a weight of 2.17.

Figure 7:
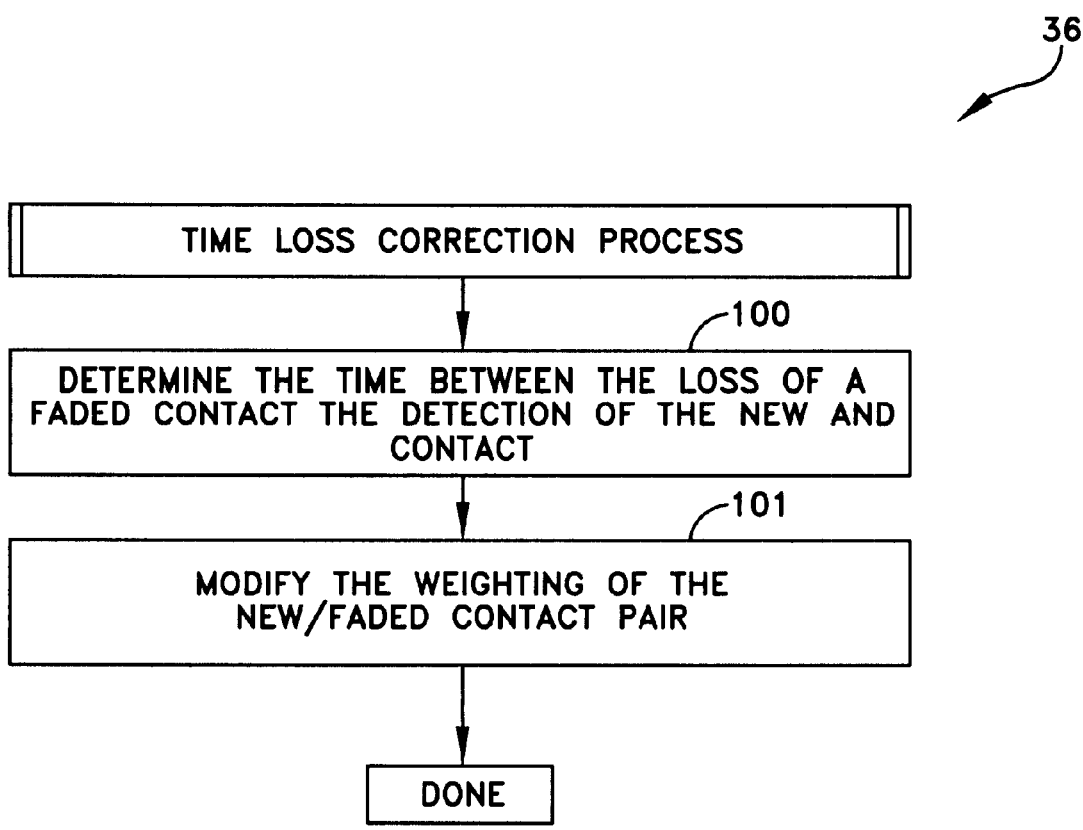
FIG. 7 is a flow chart of a time loss correction process useful in the long term fade association procedure shown in FIG. 4.

Once the contact motion process in FIG. 5 is complete, step 85 in FIG. 4 implements the time loss correction process 36 shown more specifically in FIG. 7 because the accuracy of a possible association reduces over time. That is, the premise that the tracks for two contacts can be matched based on motion and position data weakens as the time between the loss of one contact and the acquisition of a new contact increases. More specifically, there is an underlying assumption that velocities remain constant. When the time between two contacts is very short, such an assumption is valid. However, after several minutes, the assumption may no longer be valid.

In FIG. 7 step 100 determines the time between the loss of the selected faded contact and the detection of a newly acquired contact that are being analyzed. Step 101 then applies a weighting factor to the existing weighting for the association based upon that time. An inverse linear weighting has been used successfully.

Figure 8:
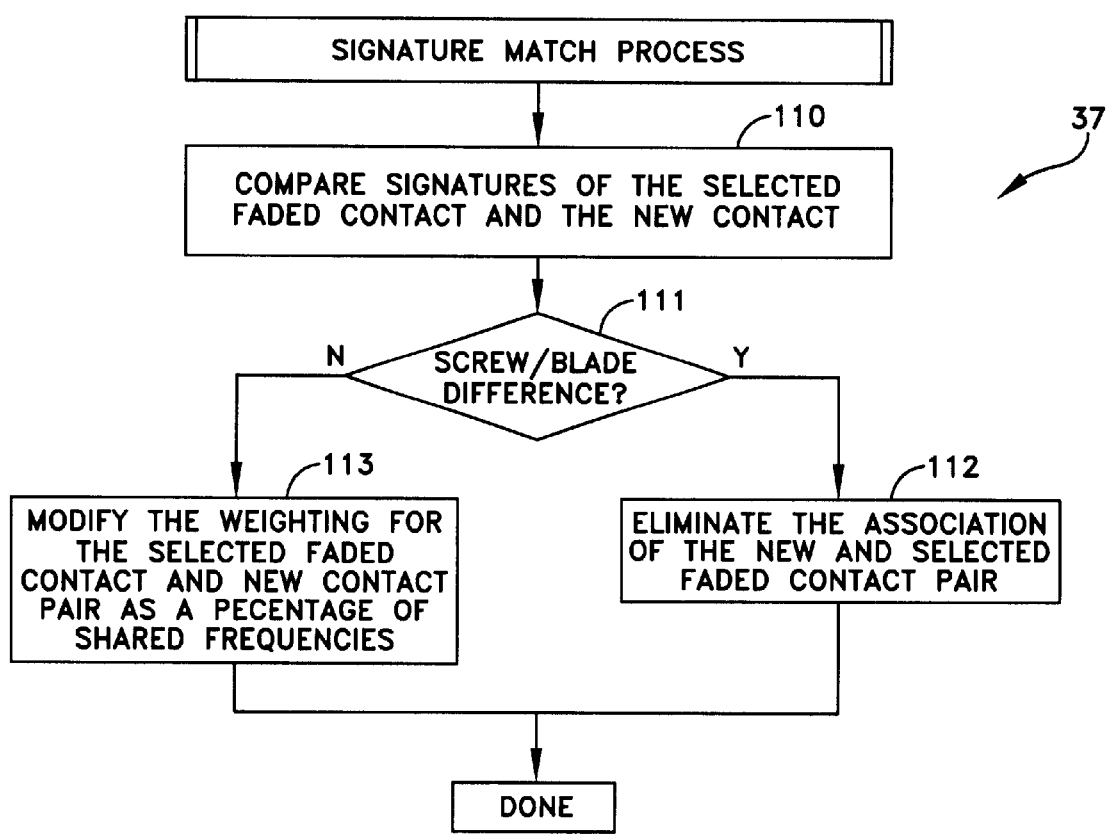
FIG. 8 is a signature match process useful in the long term fade association procedure of FIG. 4.

The next step in the process occurs when step 84 in FIG. 4 performs an analysis using the signature match process 37 shown in detail in FIG. 8. The signature match process compares the frequency signatures of the faded contact and newly acquired contact. One such process includes a two-part test. Step 110 in FIG. 8 compares the signatures. Step 111 determines whether the signatures associated with noise emanating from the propellers or screw/blades is different. Individual propellers in vessels have marketedly different frequency spectra. If the propellers are different, the newly acquired contact is not associated with a faded contact and step 112 eliminates that association. If the spectra are similar, step 111 transfers to step 113 that modifies the weighting for the selected faded contact and new contact pair. In one specific embodiment, the weighting is a function of the percentage of shared frequencies between the faded contact and the acquired contact. This computed weight is added to the corrected weight from the time loss correction.

Figure 9:
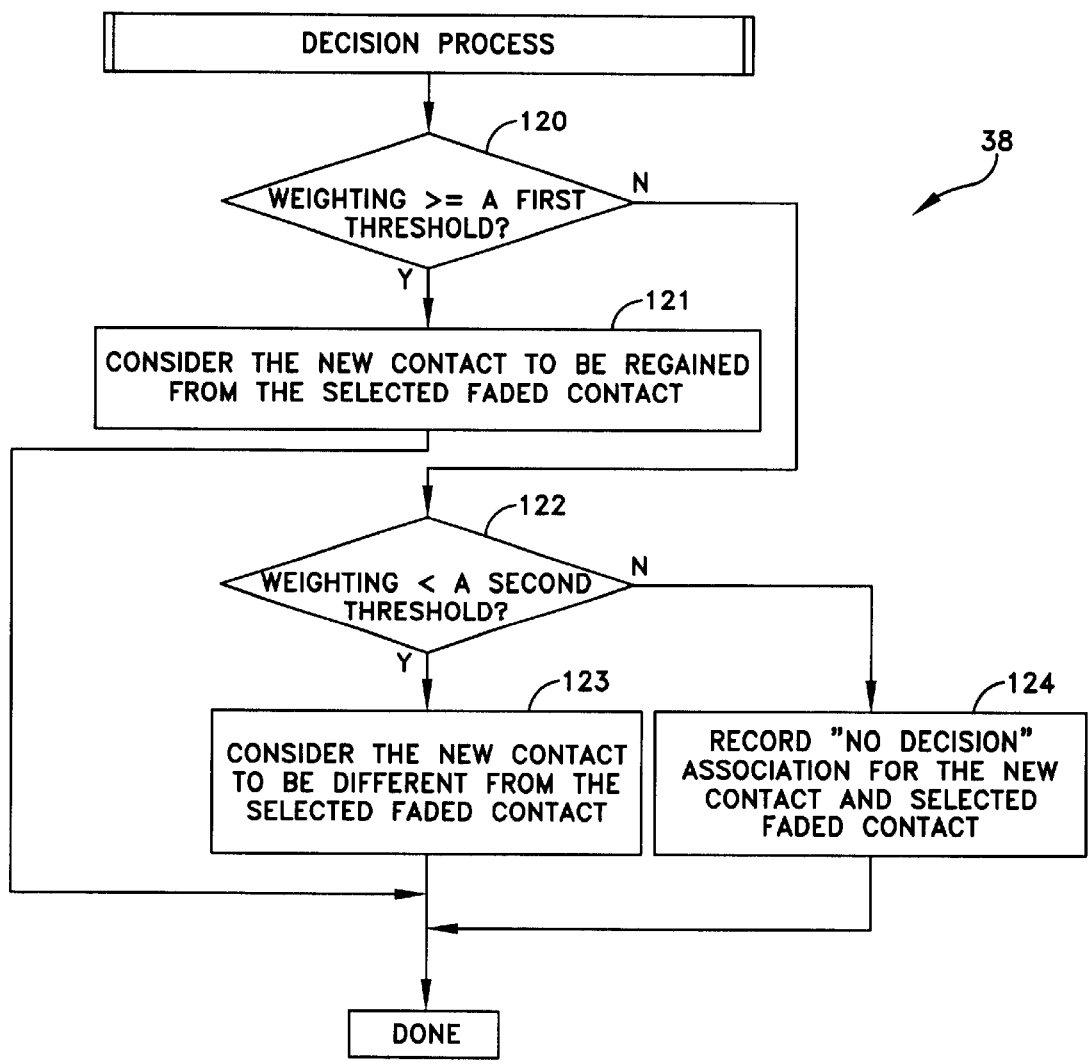
FIG. 9 is a flow chart of a decision process that is useful in the long term fade association procedure of FIG. 4.

The decision process included in the analysis of procedure 85 in FIG. 4 further analyzes the possible associations identified by the prior analyses. Step 120 in FIG. 9 determines whether the weighting of the association exceeds a first threshold. If the threshold is exceeded, step 121 marks the association so that the newly acquired contact is considered to be reacquired from the selected faded contact. If the weighting is less than the first threshold, step 120 transfers control to step 122 that determines if the weighting is less than a second threshold that, in turn, is less than the first threshold. If that occurs, step 123 considers the newly acquired contact to be different from the selected faded contact. If, on the other hand, the weighting lies between the first and second thresholds, it is difficult to determine the characterization and step 124 establishes a "no decision" state so the pair retains a possible association for analysis after a later update interval expires.

Figure 10:
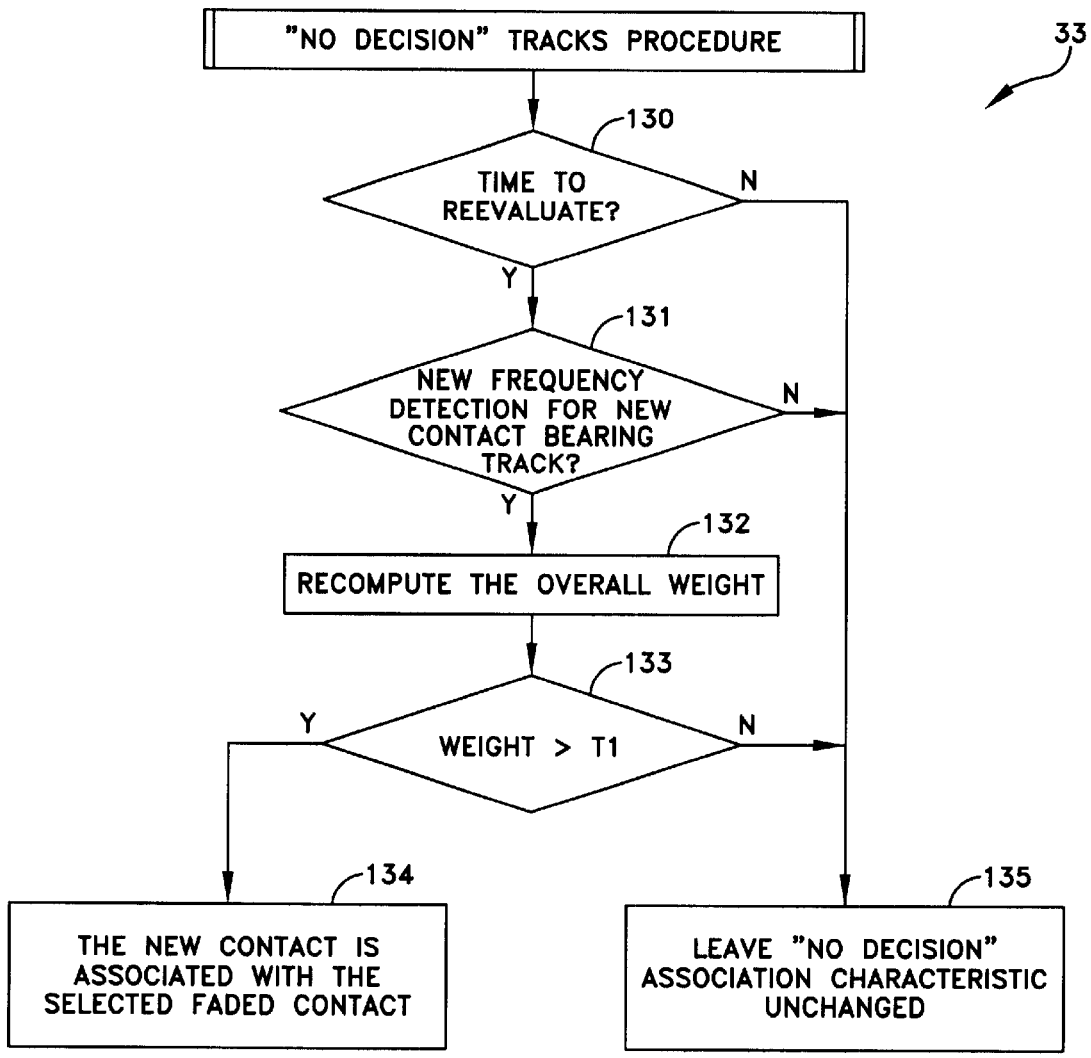
FIG. 10 is a flow chart of a "NO DECISION" tracks procedure used in the system shown in FIG. 1.

Before making a final decision however, the "no decision" tracks procedure 33 is processed to determine whether a decision can then be made. Specifically, "no decision" associations are subject to retesting after some interval of time such as 25 time updates after an initial testing with a 12 second update rate. If that time has expired, step 130 in FIG. 10 transfers control to step 131. Step 131 determines if there are any new frequency detections associated with the newly acquired contact. If there are, step 132 recomputes the overall weight assigned to the associated acquired and faded contacts using the various processes in FIGS. 5 through 9. If the overall weight exceeds the T1 threshold, step 133 transfers control to step 134 whereby the new contact is associated with the selected faded contact for purposes of additional analysis. Otherwise control transfers to step 135 that leaves the association unchanged as a "no decision" association. If it is not time to evaluate or if no new frequency detection has been found the acquired contact control also transfers to step 135 so no change is made to its characterization.

Figure 11:
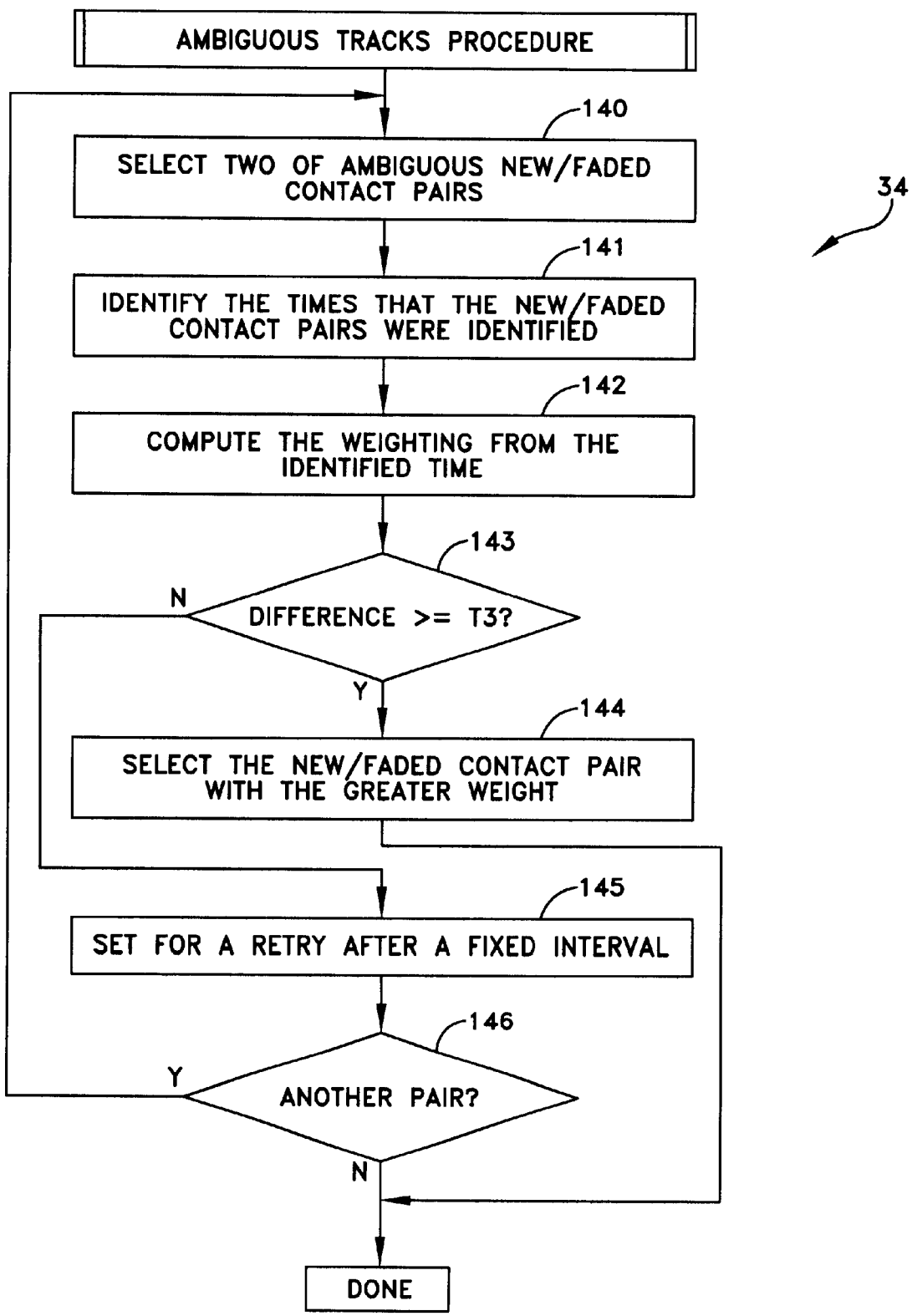
FIG. 11 is a flow chart that depicts an ambiguous tracks procedure used in the system of FIG. 1.

Generally when the foregoing procedures and processes have been completed for a newly acquired contact, the test list 22 in FIG. 1 contains a list of all faded contacts that could be associated with the newly acquired contact. The ambiguous tracks procedure 34 in FIG. 1 attempts to resolve any ambiguities if two or more associations exist. As specifically shown in FIG. 11, step 140 selects two of the ambiguous association between the new acquired contact and two faded contact. For each, step 141 identifies the times that the ambiguities were found in these two pairs. In step 142, the weighting established by the processes in FIGS. 5 through 9 is then applied but from the time of the ambiguity. If the difference is greater than a threshold T3, step 143 selects the acquired/faded contact pair with the greater weight in step 144. If not, step 143 transfers control to step 145 so the possible association is identified for subsequent repeated testing, generally, for example, 25 time updates later. This process continues under the control of step 146 until all the ambiguous associations with the acquired contact have been tested. Thus step 144 filters any pair with the lesser weight from further consideration. Assuming that at least one association was identified, at the end of the process the newly acquired contact is characterized as a reacquired faded contact for the faded contact in the remaining association.

Consequently when the process in FIG. 2 is complete, step 46 displays that association. It may also display multiple associations in the order of their weighted ranking. Even if this process identifies more than one possible association, the method and apparatus greatly reduced the requirements for analysis by the sonar operator because many of the possible associations will have been eliminated as a result of the analysis provided by this invention.

As will be apparent this process could be implemented in either a general purpose computer or a special purpose computer or array. It will also be apparent that the processing times involved for any of these steps is short thereby allowing the system to operate with a number of acquired contacts and faded contacts expeditiously thereby providing the sonar operator with timely and enhanced information.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for determining whether an acquired contact from a sonar system represents a new contact or a reacquired faded contact comprising the steps of:
   establishing a record of faded contacts;
   identifying at least one association between the acquired contact and a recorded faded contact; and
   determining through an analysis of the identified associations the characterization of the acquired contact as one of new, reacquired faded and indeterminate contacts.

2. A method as recited in claim 1 wherein said identification of at least one association includes:
   performing a first comparison of the acquired contact with first selected faded contacts lost during a first interval prior to the acquisition of the acquired contact; and
   performing a second comparison of the acquired contact with selected second faded contacts lost during a second interval greater than the first interval and prior to the acquisition of the acquired contact whereby each of said first and second comparison is the basis for the determination of a possible association between the acquired contact and the compared faded contact.

3. A method as recited in claim 2 wherein said first comparison includes the step of extrapolating the paths of the acquired and selected first faded contacts backward and forward, respectively, over the first interval to determine if the acquired and selected first contacts are possibly associated.

4. A method as recited in claim 3 wherein the acquired contact and selected first faded contact include changes in bearing and said extrapolation includes determining an interval for extrapolation dependent upon the rate of change in bearing.

5. A method as recited in claim 2 wherein said second comparison includes:
   selecting a second faded contact to define a possible association for analysis;
   weighting the possible association in response to a plurality of signal characteristics for the acquired and selected second faded contacts;
   further weighting the possible association as a function of the time interval between the loss of the selected second faded contact and the acquisition of the acquired contact; and
   further weighting the possible association by matching the information contained in the sonar signals for each of the acquired and selected second faded contacts.

6. A method as recited in claim 5 wherein said weighting of a possible association in response to characteristics additionally includes the steps of:
   defining bearing and range boundaries from the last known position of the selected second faded contact; and
   comparing the position of the acquired contact with said defined boundaries.

7. A method as recited in claim 5 wherein said further weighting as a function of time interval includes the step of determining the time interval that exists between the loss of the selected second faded contact and the acquisition of the acquired contact.

8. A method as recited in claim 5 wherein each contact has a frequency signature, said method comprising a further weighting of the association by matching the frequency signatures that includes:
   comparing the frequency signatures of the acquired and selected second faded contacts; and
   eliminating the acquired and selected second faded contacts as a possible association when the compared frequency signatures exhibit different frequencies.

9. A method as recited in claim 5 wherein a plurality of possible associations for each acquired contact result from said identification and wherein method additionally includes the steps of:
   weighting of each possible association of the acquired contact and each selected faded contact; and
   selecting one of the possible associations based upon the relative weights assigned to each possible association.

10. A method as recited in claim 9 wherein certain of the possible associations for each acquired contact are identified as ambiguous possible associations and wherein said method additionally includes the steps of:
    computing the weighting of each of the ambiguous possible associations from the time of the association ambiguity; and
    selecting the possible association that has the greatest weight exceeding a threshold as having an acquired contact that is reacquired from the selected faded contact.

11. Apparatus for determining whether an acquired contact from a sonar system represents a new contact or a reacquired faded contact comprising:
    a system for generating input signals representative of contacts including newly acquired contacts;
    a contact data store with a record of faded contacts; and
    a control module for processing the input signals and data from said contact data store for determining if a newly acquired contact is a reacquired faded contact, said control module including:
        an association identification module for identifying at least one association between the newly acquired contact and a faded contact; and
        an analysis module for determining through an analysis of the identified associations the characterization of the acquired contact as one of new, reacquired faded and indeterminate contacts.

12. Apparatus as recited in claim 11 wherein said association identification module comprises:
    short term association means for a first comparing an acquired contact with first faded contacts lost during a first interval prior to the acquisition of the acquired contact; and
    long term association means for a comparing an acquired contact with second faded contacts lost during a second interval greater than the first interval prior to the acquisition of the acquired contact whereby said short and long term association means provide a determination of a possible association between the acquired contact and the selected faded contact.

13. Apparatus as recited in claim 12 wherein said short term association means includes first and second extrapolation means for extrapolating the paths of the acquired and selected faded contact backward and forward, respectively over the first interval and means for response to said first and second extrapolation means for determining if the acquired and selected contacts are possibly associated.

14. Apparatus as recited in claim 13 wherein the acquired and selected faded contacts include changes in bearing and said first and second extrapolation means determining an interval for extrapolation dependent upon the rate of change in bearing.

15. Apparatus as recited in claim 12 wherein said long term association means includes:

means for selecting a faded contact to define a possible association for analysis;

first weighting means for weighting the possible association in response to a plurality of signal characteristics of the acquired and selected faded contacts;

second weighting means for weighting the possible association of a function of the time interval between the loss of the selected faded contact and the acquisition of the acquired contact; and third weighting means for weighting the possible association by matching the information contained in the sonar signals for each of the acquired and selected faded contact.

16. Apparatus as recited in claim 15 wherein said first weighting means includes means for defining bearing and range boundaries from the last known position of the selected faded contact and means for comparing the position of the acquired contact with that boundary.

17. Apparatus as recited in claim 15 wherein said second weighting means includes the means for determining the interval that exists between the loss of the selected faded contact and the acquisition of the acquired contact.

18. Apparatus as recited in claim 15 wherein said third weighting means includes means for eliminating the acquired and selected faded contacts as a possible association when the frequency signatures of the acquired and selected faded contacts differ.

19. Apparatus as recited in claim 15 wherein said analysis module includes means for the weighting characterization of each possible association identified by said association identification means.

20. Apparatus as recited in claim 19 wherein said association identification module identifies more than one association and said analysis module additionally includes:

means for computing a weight of each of the associations from the time the ambiguity in associations is determined; and means for selecting an association that has the greatest weight exceeding a threshold.

* * * * *